(12) United States Patent
Jeong et al.

(10) Patent No.: US 10,790,876 B2
(45) Date of Patent: Sep. 29, 2020

(54) INTEGRATED CIRCUIT

(71) Applicants: SK hynix Inc., Gyeonggi-do (KR); Seoul National University R&DB Foundation, Seoul (KR)

(72) Inventors: Deog-Kyoon Jeong, Seoul (KR); Suhwan Kim, Seoul (KR); Sung-Phil Choi, Seoul (KR)

(73) Assignees: SK hynix Inc., Gyeonggi-do (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 16/221,720

(22) Filed: Dec. 17, 2018

(65) Prior Publication Data

US 2019/0305819 A1 Oct. 3, 2019

(30) Foreign Application Priority Data

Mar. 28, 2018 (KR) .......................... 10-2018-0036138

(51) Int. Cl.
*H04B 3/487* (2015.01)
*H04B 3/462* (2015.01)
*H04B 3/32* (2006.01)

(52) U.S. Cl.
CPC .............. *H04B 3/487* (2015.01); *H04B 3/32* (2013.01); *H04B 3/462* (2013.01)

(58) Field of Classification Search
CPC ........... H04B 3/487; H04B 3/32; H04B 3/462
See application file for complete search history.

(56) References Cited

U.S. PATENT DOCUMENTS 10,110,318 B2 * 10/2018 Streshinsky ......... G02B 6/4266

FOREIGN PATENT DOCUMENTS

| KR | 100739762 | 7/2007 |
|---|---|---|
| KR | 1020170072391 | 6/2017 |

OTHER PUBLICATIONS

Oh, T. et al., A 12-Gb/s Multichannel I/O Using MIMO Crosstalk Cancellation and Signal Reutilization in 65-nm CMOS, IEEE Journal of Sold-State Circuits Jun. 2013, pp. 1383-1897, vol. 48, No. 6, IEEE.

* cited by examiner

*Primary Examiner* — Chandrahas B Patel
(74) *Attorney, Agent, or Firm* — IP & T Group LLP

(57) ABSTRACT

An integrated circuit may include: a first transmission line; a second transmission line; a first compensator circuit suitable for generating a first compensation signal by delaying and differentiating a signal transferred through the second transmission line; a second compensator circuit suitable for generating a second compensation signal by delaying and differentiating a signal transferred through the first transmission line; a first receiver circuit suitable for receiving the signal transferred through the first transmission line, and compensating for the signal transferred through the first transmission line using the first compensation signal; and a second receiver circuit suitable for receiving the signal transferred through the second transmission line, and compensating for the signal transferred through the second transmission line using the second compensation signal.

9 Claims, 7 Drawing Sheets

INTEGRATED CIRCUIT

CROSS-REFERENCE TO RELATED APPLICATION

This application claims priority under 35 U.S.C. § 119 to Korean Patent Application No. 10-2018-0036138, filed on Mar. 28, 2018, which is incorporated herein by reference in its entirety.

BACKGROUND

1. Field

The present invention relates to an improved integrated circuit and a method of operating the same.

2. Discussion of the Related Art

A multi-channel parallel interface is frequently used because it allows high-speed communication. However, inductive and capacitive coupling between adjacent channels may cause far-end crosstalk (FEXT).

FIG. 1 illustrates that signals are transmitted and received through two lines 101 and 102 adjacent to each other in an integrated circuit 100. Referring to FIG. 1, signals are transmitted from a transmitting terminal 110 to a receiving terminal 120 through the lines 101 and 102. In FIG. 1, 'FEXT1' represents far-end crosstalk from the line 101 to the line 102, and 'FEXT2' represents far-end crosstalk from the line 102 to the line 101.

FIG. 2 illustrates far-end crosstalk between the lines 101 and 102 in the integrated circuit 100 of FIG. 1. For example, FIG. 2 illustrates voltages of the receiving terminals 120 of the lines 101 and 102. Noise may be generated at the receiving terminal 120 of the line 102 by a signal transmitted to the line 101. In this case, the line 101 is an aggressor, and the line 102 is a victim. Referring to FIG. 2, in periods 201 and 202, the voltage level of the receiving terminal 120 of the line 101 is changed and, as a result, noise may occur in the line 102. That is, noise may be generated by the cross talk FEXT1 in the line 102.

Since the noise caused by the crosstalk between the adjacent lines disturbs high-speed communication, there is a demand for a technique capable of removing crosstalk.

SUMMARY

Various embodiments are directed to a technology capable of effectively removing crosstalk between adjacent transmission lines.

In an embodiment, an integrated circuit may include: a first transmission line; a second transmission line; a first compensator circuit suitable for generating a first compensation signal by delaying and differentiating a signal transferred through the second transmission line; a second compensator circuit suitable for generating a second compensation signal by delaying and differentiating a signal transferred through the first transmission line; a first receiver circuit suitable for receiving the signal transferred through the first transmission line, and compensating for the signal transferred through the first transmission line using the first compensation signal; and a second receiver circuit suitable for receiving the signal transferred through the second transmission line, and compensating for the signal transferred through the second transmission line using the second compensation signal.

The first compensator circuit may have a delay value which corresponds to ([delay value of far-end crosstalk from the second transmission line to the first transmission line]–[delay value of the first transmission line]), and the second compensator circuit may have a delay value which corresponds to ([delay value of far-end crosstalk from the first transmission line to the second transmission line]–[delay value of the second transmission line]).

In an embodiment, a method for operating an integrated circuit may include: generating a first compensation signal by delaying and differentiating a signal transferred through a second transmission line; generating a second compensation signal by delaying and differentiating a signal transferred through a first transmission line; receiving the signal transferred through the first transmission line, and compensating for the signal transferred through the first transmission line using the first compensation signal; and receiving the signal transferred through the second transmission line, and compensating for the signal transferred through the second transmission line using the second compensation signal.

DETAILED DESCRIPTION

Figure 1:
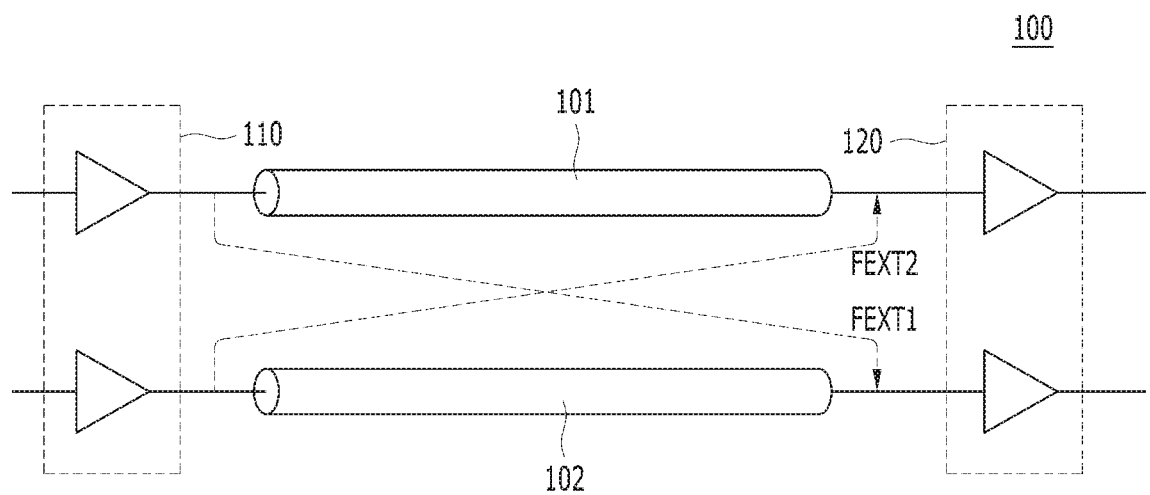
FIG. 1 is a diagram illustrating an integrated circuit including lines according to the prior art.
Figure 2:
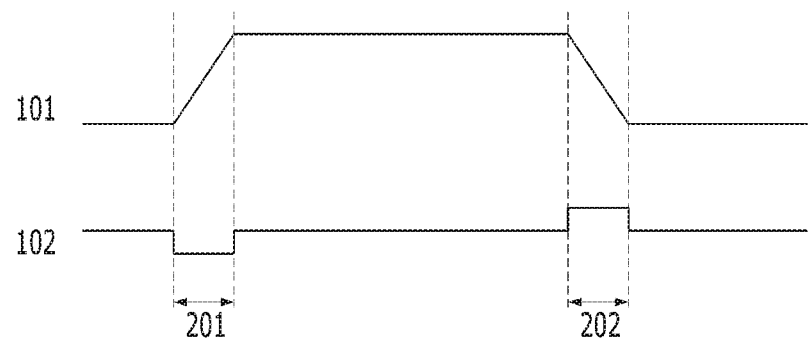
FIG. 2 illustrates far-end crosstalk between lines in an integrated circuit according to the prior art.

Various embodiments will be described below in more detail with reference to the accompanying drawings. The present invention may, however, be embodied in different forms and thus is not limited to the embodiments set forth herein. Rather, these embodiments are provided so that this disclosure is thorough and complete and fully conveys the scope of the present invention to those skilled in the art. Throughout the disclosure, like reference numerals refer to like parts throughout the various figures and embodiments of the present invention. Also, throughout the specification, reference to "an embodiment," "another embodiment," or the like is not necessarily to only one embodiment, and different references to any such phrase are not necessarily to the same embodiment(s).

Figure 3:
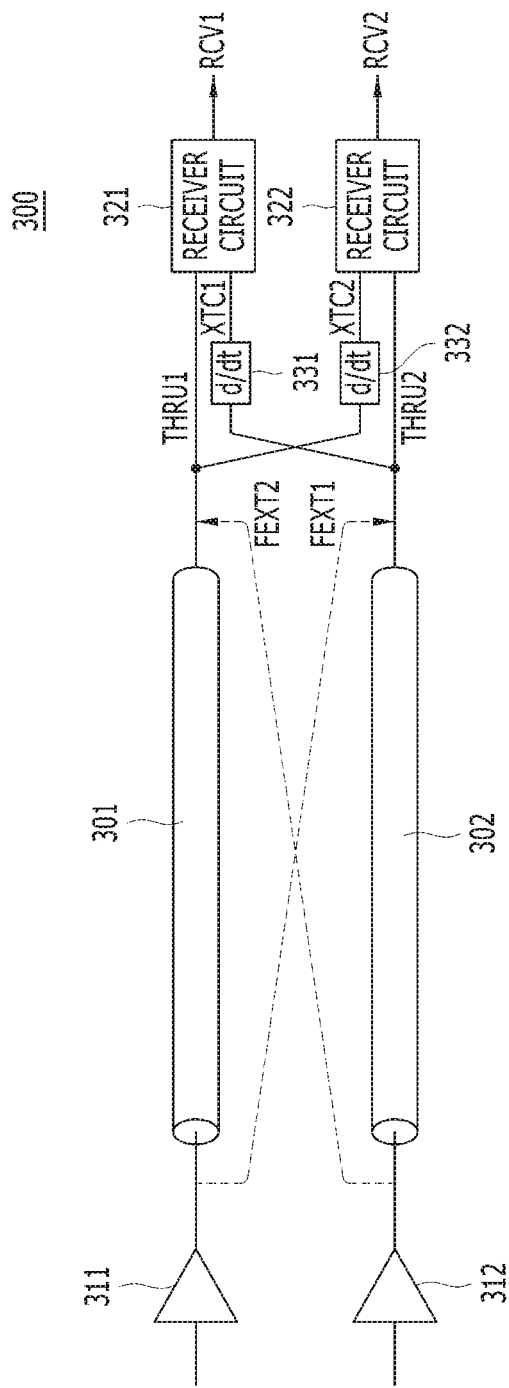
FIG. 3 is a diagram illustrating an integrated circuit in accordance with an embodiment of the present invention.

FIG. 3 is a diagram illustrating an integrated circuit 300 in accordance with an embodiment.

Referring to FIG. 3, the integrated circuit 300 may include first and second transmitters 311 and 312, first and second transmission lines 301 and 302, first and second differentiator circuits 331 and 332, and first and second receiver circuits 321 and 322.

The first transmitter 311 may transmit a signal through the first transmission line 301, and the second transmitter 312 may transmit a signal through the second transmission line 302. In FIG. 3, 'FEXT1' represents far-end crosstalk which is caused at a receiving terminal of the second transmission line 302 by the signal transmitted through the first transmission line 301, and 'FEXT2' represents far-end crosstalk which is caused at a receiving terminal of the first transmission line 301 by the signal transmitted through the second transmission line 302. Furthermore, 'THRU1' indicates that the signal transmitted by the first transmitter 311 has passed through the first transmission line 301, and 'THRU2' indicates that the signal transmitted by the second transmitter 312 has passed through the second transmission line 302.

The first differentiator circuit 331 may generate a first compensation signal XTC1 by differentiating the signal THRU2 transmitted through the second transmission line 302. The second differentiator circuit 332 may generate a second compensation signal XTC2 by differentiating the signal THRU1 transmitted through the first transmission line 301.

The first receiver circuit 321 may receive the signal THRU1 of the first transmission line 301, and compensate for the signal THRU1 using the first compensation signal XTC1. The first receiver circuit 321 may add up the signal THRU1 and the first compensation signal XTC1, in order to cancel the crosstalk FEXT2 which occurred in the signal THRU1. 'RCV1' may represent the signal received by the first receiver circuit 321.

The second receiver circuit 322 may receive the signal THRU2 of the second transmission line 302, and compensate for the signal THRU2 using the second compensation signal XTC2. The second receiver circuit 322 may add up the signal THRU2 and the second compensation signal XTC2, in order to cancel the crosstalk FEXT1 which occurred in the signal THRU2. 'RCV2' may represent the signal received by the second receiver circuit 322.

Figure 4:
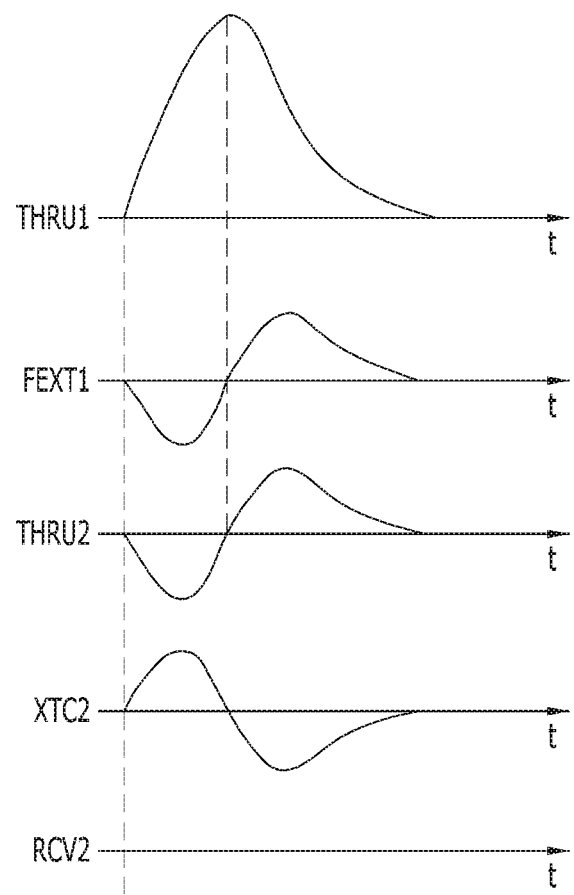
FIG. 4 is a timing diagram illustrating an operation of an integrated circuit in accordance with an embodiment of the present invention.

FIG. 4 is a timing diagram illustrating an operation of an integrated circuit in accordance with an embodiment, for example, the operation of the integrated circuit 300 in FIG. 3.

For example, FIG. 4 illustrates a situation in which the signal THRU1 is transmitted to the first transmission line 301, and the signal THRU2 of the second transmission line 302 is influenced by the signal THRU1 to occur the crosstalk FEXT1.

Referring to FIG. 4, when the voltage level of the signal THRU1 of the first transmission line 301 rises and falls, the far-end crosstalk FEXT1 occurs to generate noise in the signal THRU2 of the second transmission line 302.

The second differentiator circuit 332 may generate the second compensation signal XTC2 by differentiating the signal THRU1. The second compensation signal XTC2 may have the opposite polarity to the far-end crosstalk FEXT1.

Since the second receiver circuit 322 receives the signal THRU2 and performs the process of adding up the signal THRU2 and the second compensation signal XTC2, the far-end crosstalk FEXT1 may be removed from the received signal RCV2.

The operation of FIG. 4 is based on the supposition that a flight time required for transferring the signal THRU1 through the first transmission line 301 is equal to a flight time required for transfer of the far-end crosstalk FEXT1. In reality, however, a timing mismatch may occur because the flight time required for transferring the signal THRU1 through the first transmission line 301 is shorter than the flight time for transfer of the far-end crosstalk FEXT1.

Figure 5:
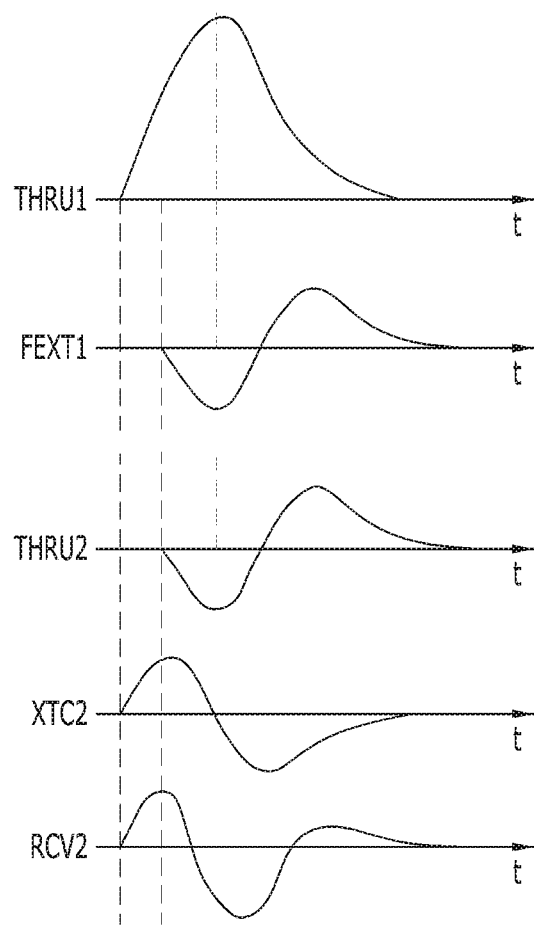
FIG. 5 is a timing diagram illustrating an operation of an integrated circuit in consideration of a mismatch between flight times for transferring a signal and crosstalk in accordance with an embodiment of the present invention.

FIG. 5 illustrates an operation in the same situation as FIG. 4, but reflects the mismatch between the flight time required for transferring the signal THRU1 to the first transmission line 301 and the flight time for transfer of the far-end crosstalk FEXT1.

Referring to FIG. 5, when the voltage level of the signal THRU1 of the first transmission line 301 rises and falls, the far-end crosstalk FEXT1 occurs to generate noise in the signal THRU2 of the second transmission line 302. However, the timing of the noise generated in the far-end crosstalk FEXT1 and the signal THRU2 may lag behind the timing of the signal THRU1, due to the difference in flight time between the signal THRU1 and the far-end cross talk FEXT1.

The second differentiator circuit 332 may generate the second compensation signal XTC2 by differentiating the signal THRU1 of the first transmission line 301. A timing mismatch may be present between the second compensation signal XTC2 and the noise of the signal THRU2 of the second transmission line 302.

The second receiver circuit 322 may receive the signal THRU2 and perform a process of adding up the signal THRU2 and the second compensation signal XTC2. However, the far-end crosstalk FEXT1 may not be normally removed from the signal RCV2 received by the second receiver circuit 322, due to the timing mismatch between the second compensation signal XTC2 and the noise present in the signal THRU2.

Figure 6:
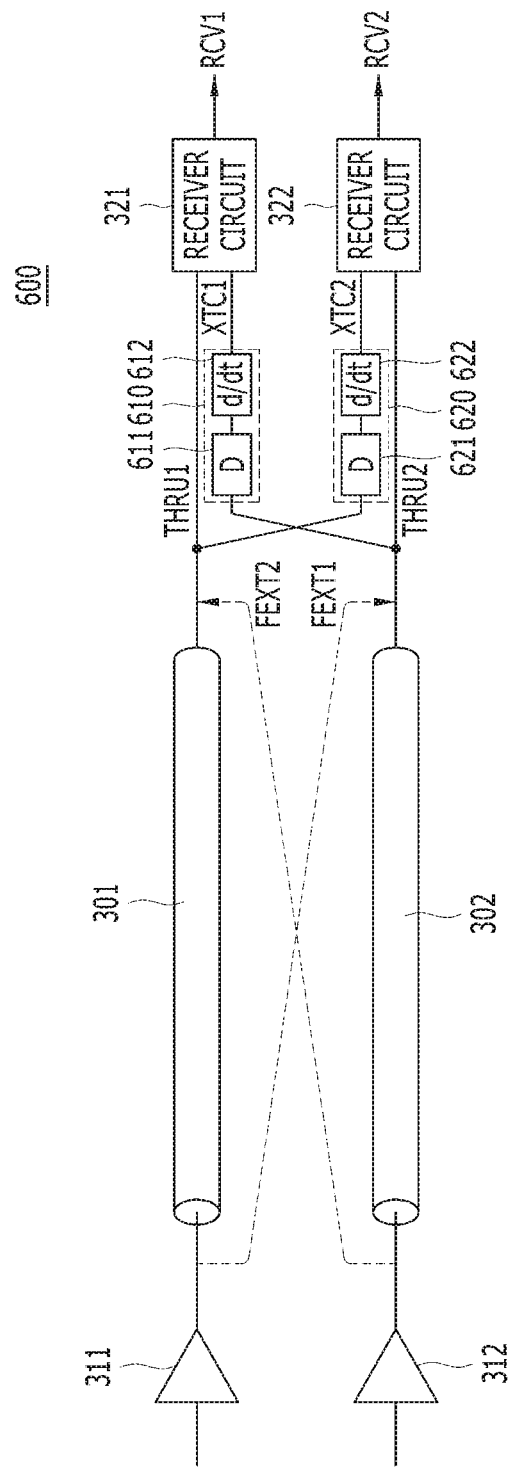
FIG. 6 is a diagram illustrating an integrated circuit in accordance with another embodiment of the present invention.

FIG. 6 is a diagram of an integrated circuit 600 in accordance with another embodiment.

Referring to FIG. 6, the integrated circuit 600 may include first and second transmitters 311 and 312, first and second transmission lines 301 and 302, first and second compensator circuits 610 and 620, and first and second receiver circuits 321 and 322. In the embodiment of FIG. 6, the first and second differentiator circuits 331 and 332 of FIG. 3 may be replaced with the first and second compensator circuits 610 and 620.

The first compensator circuit 610 may generate the first compensation signal XTC1 by delaying and differentiating the signal THRU2 of the second transmission line 302. The first compensator circuit 610 may be different from the first differentiator circuit 331 of FIG. 3 in that the first compensator circuit 610 does not simply differentiate the signal THRU2, but delays and differentiates the signal THRU2. The first compensator circuit 610 may have a delay value which approximately corresponds to ([delay value of far-end crosstalk FEXT2 from second transmission line 302 to first transmission line 301]−[delay value of first transmission line 301]). The delay operation of the first compensator circuit 610 may compensate for a mismatch between the flight time of the signal THRU2 and the flight time of the far-end crosstalk FEXT2.

The first compensator circuit 610 may include a first delay circuit 611 and a first differentiator circuit 612. The first delay circuit 611 may have a delay value which approximately corresponds to ([delay value of far-end crosstalk FEXT2 from second transmission line 302 to first transmission line 301]−[delay value of first transmission line 301]−

[delay value of first differentiator circuit 612]). For example, FIG. 6 illustrates that the first differentiator circuit 612 is positioned at the rear of the first delay circuit 611. However, the first delay circuit 611 may be positioned at the rear of the first differentiator circuit 612.

The second compensator circuit 620 may generate the second compensation signal XTC2 by delaying and differentiating the signal THRU1 of the first transmission line 301. The second compensator circuit 620 may be different from the second differentiator circuit 332 of FIG. 3 in that the second compensator circuit 620 does not simply differentiate the signal THRU1 but delays and differentiates the signal THRU1. The second compensator circuit 620 may have a delay value which approximately corresponds to ([delay value of far-end crosstalk FEXT1 from first transmission line 301 to second transmission line 302]–[delay value of second transmission line 302]). The delay operation of the second compensator circuit 620 may compensate for a mismatch between the flight time of the signal THRU1 and the flight time of the far-end crosstalk FEXT1.

The second compensator circuit 620 may include a second delay circuit 621 and a second differentiator circuit 622. The second delay circuit 621 may have a delay value which approximately corresponds to ([delay value of far-end crosstalk FEXT1 from first transmission line 301 to second transmission line 302]–[delay value of second transmission line 302]–[delay value of second differentiator circuit 622]). For example, FIG. 6 illustrates that the second differentiator circuit 622 is positioned at the rear of the second delay circuit 621. However, the second delay circuit 621 may be positioned at the rear of the second differentiator circuit 622.

Since the first and second transmission lines 301 and 302 have the same length and characteristics, the delay value of the first compensator circuit 610 may be equal to the delay value of the second compensator circuit 620.

Now, the delay value, which the first and second compensator circuits 610 and 620 have, will be described.

Assuming that a transfer function of the first and second transmission lines 301 and 302 is a low pass filter, the transfer function of the channels 301 and 302 may be expressed as Equation 1 below.

$$H_{CH}(s) = \frac{1}{1 + s/p_{CH}} \quad \text{[Equation 1]}$$

Since the crosstalks FEXT1 and FEXT2 can be represented as differentiated values of the signals transmitted to the transmission lines 301 and 302, a transfer function of the crosstalks FEXT1 and FEXT2 may be expressed as Equation 2 below.

$$H_{FEXT}(s) = -s\tau H_{CH}(s) = \frac{-s\tau}{1 + s/p_{CH}} \quad \text{[Equation 2]}$$

In Equation 2, $\tau$ represents forward coupling strength which increases as the distance d between the lines (or channels) 301 and 302 is reduced.

Since the transfer functions of the lines 301 and 302 and the crosstalks FEXT1 and FEXT2 are known, the delay value of the lines 301 and 302 may be expressed as Equation 3, and the delay value of the crosstalks FEXT1 and FEXT2 may be expressed as Equation 4.

$$D_{CH}(\omega) = -\frac{d\theta_{CH}(\omega)}{d\omega} = -\frac{d}{d\omega}\left(-\tan^{-1}\left(\frac{\omega}{\omega_{CH}}\right)\right) = \frac{1}{\omega_{CH}\left(1 + \frac{\omega^2}{\omega_{CH}^2}\right)} \quad \text{[Equation 3]}$$

$$D_{FEXT}(\omega) = -\frac{d\theta_{FEXT}(\omega)}{d\omega} = -\frac{d}{d\omega}\left(-\tan^{-1}(\tau\omega) - \tan^{-1}\left(\frac{\omega}{\omega_{CH}}\right)\right) = \frac{\tau}{1 + \tau^2\omega^2} + \frac{1}{\omega_{CH}\left(1 + \frac{\omega^2}{\omega_{CH}^2}\right)} \quad \text{[Equation 4]}$$

A difference $T_d$ between the delay value $D_{FEXT}(\omega)$ of the crosstalks FEXT1 and FEXT2 and the delay value $D_{CH}(\omega)$ of the transmission lines 301 and 302 may be expressed as Equation 5 below.

$$T_d = D_{FEXT}(\omega) - D_{CH}(\omega) = \frac{\tau}{1 + \tau^2\omega^2} \quad \text{[Equation 5]}$$

The difference $T_d$ of Equation 5 may correspond to a delay value which the first and second compensator circuits 610 and 620 need to have.

The first differentiator circuit 612 within the first compensator circuit 610 and the second differentiator circuit 622 within the second compensator circuit 620 also inevitably have delay values. Hereafter, the delay value of the first and second differentiator circuits 612 and 622 and the delay value of the first and second delay circuits 611 and 621 will be described.

Figure 7:
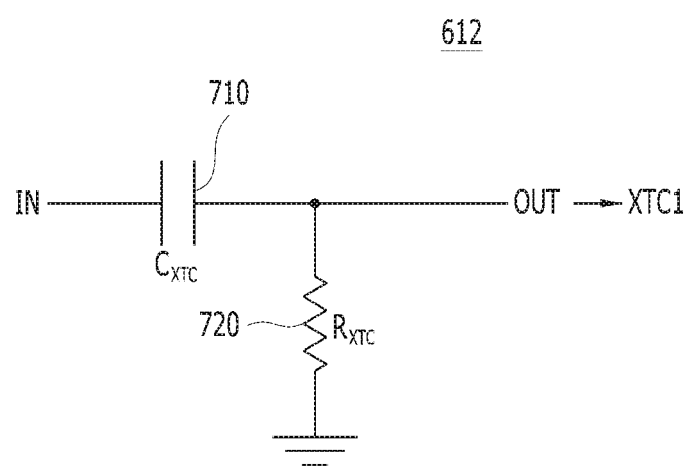
FIG. 7 is a circuit diagram illustrating a first differentiator circuit in accordance with an embodiment of the present invention.

FIG. 7 is a circuit diagram illustrating a first differentiator circuit in accordance with an embodiment, for example, the first differentiator circuit 612 of FIG. 6. The second differentiator circuit 622 may also have the same configuration as FIG. 6.

Referring to FIG. 7, the first differentiator circuit 612 may include a capacitor 710 coupled between an input terminal IN and an output terminal OUT and a resistor 720 coupled between the output terminal OUT and a ground terminal. The input terminal IN may be coupled to an output terminal of the first delay circuit 611. The first compensation signal XTC1 may be outputted from the output terminal OUT. $R_{XTC}$ may represent a resistance value of the resistor 720, and $C_{XTC}$ may represent capacitance of the capacitor 710.

The first differentiator circuit 612 configured in the form of an RC high pass filter may have a delay value $D_{diff}$ which is expressed as Equation 6 below.

$$D_{diff}(\omega) = -\frac{d\theta_{diff}(\omega)}{d\omega} = \frac{R_{XTC}C_{XTC}}{1 + R_{XTC}^2 C_{XTC}^2 \omega^2} \quad \text{[Equation 6]}$$

The delay value which the first and second compensator circuits 610 and 620 need to have is the difference $T_d$ of Equation 5. The delay value of the first and second differentiator circuits 612 and 622 is the delay value $D_{diff}$ of Equation 6. Therefore, the first and second delay circuits 611 and 612 need to have a delay value of $(T_d - D_{diff})$, and the delay value may be expressed as Equation 7 below.

$$T_d - D_{diff} = \frac{\tau}{1 + \tau^2\omega^2} - \frac{R_{XTC}C_{XTC}}{1 + R_{XTC}^2 C_{XTC}^2 \omega^2} \quad \text{[Equation 7]}$$

The first and second delay circuits 611 and 612 may be designed to have the delay value of Equation 7. Alternatively, a variety of delays such as an RC delay and inverter delay may be applied as the delay method of the first and second delay circuits 611 and 612.

When the first and second differentiator circuits 612 and 622 are designed to have the same delay value as the delay value $T_d$ which the first and second compensator circuits 610 and 620 need to have, the first and second delay circuits 611 and 621 may be omitted from the first and second compensator circuits 610 and 620. For example, when the product of the capacitance $C_{XTC}$ and the resistance value $R_{XTC}$ of the first and second differentiator circuits 621 and 622 is equal to the forward coupling strength $\tau$ ($R_{XTC}*C_{XTC}=\tau$), the first and second delay circuits 611 and 612 may be omitted because Equation 7 becomes zero.

Figure 8:
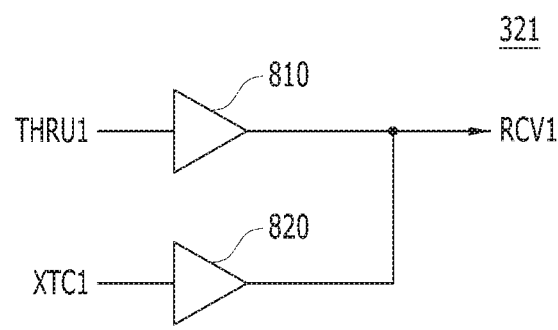
FIG. 8 is a circuit diagram illustrating a first receiver circuit in accordance with an embodiment of the present invention.

FIG. 8 is a circuit diagram illustrating a first receiver circuit in accordance with an embodiment, for example, the first receiver circuit 321 of FIG. 6. The second receiver circuit 322 of FIG. 6 may also have the same configuration as FIG. 8.

Referring to FIG. 8, the first receiver circuit 321 may include first and second receivers 810 and 820.

The first receiver 810 may receive the signal THRU1 transferred through the first transmission line 301 and drive the signal RCV1 in response to the signal THRU1.

The second receiver 820 may receive the first compensation signal XTC1 and drive the signal RCV1 in response to the first compensation signal XTC1.

Finally, the signal THRU1 and the first compensation signal XTC1 may be added up by the first and second receivers 810 and 820, thereby generating the signal RCV1. The first and second receivers 810 and 820 may have gains which are differentially adjusted depending on the strength of the crosstalk FEXT2.

Figure 9:
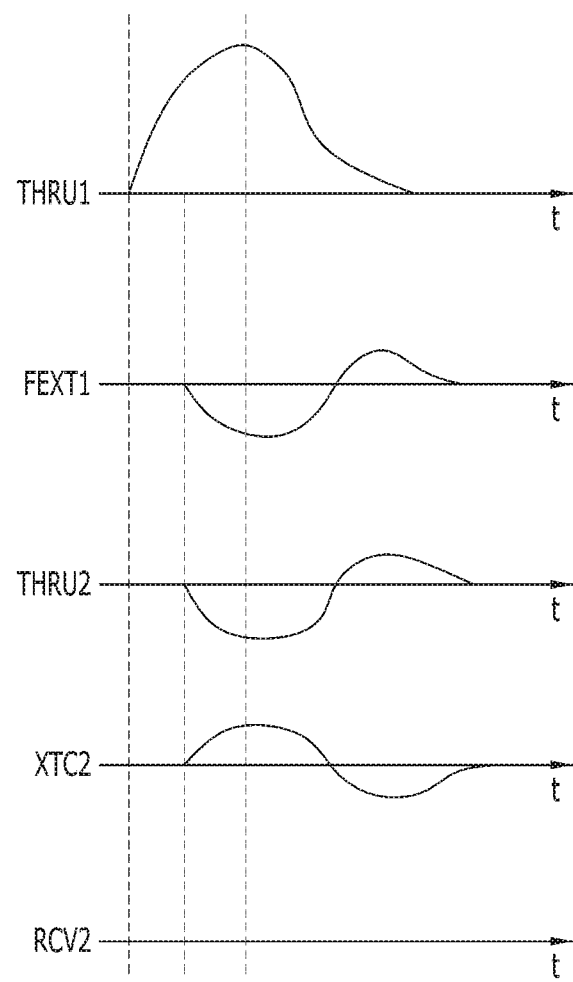
FIG. 9 is a timing diagram illustrating an operation of an integrated circuit in accordance with an embodiment of the present invention.

FIG. 9 is a timing diagram illustrating an operation of an integrated circuit in accordance with an embodiment, for example, the operation of the integrated circuit 600 in FIG. 6.

For example, FIG. 9 shows that, when the voltage level of the signal THRU1 of the first transmission line 301 rises and falls, the far-end crosstalk FEXT1 occurs to generate noise in the signal THRU2 of the second transmission line 302. The timing of the noise generated in the far-end crosstalk FEXT1 and the signal THRU2 may lag behind the timing of the signal THRU1, due to the difference in flight time between the signal THRU1 and the far-end cross talk FEXT1.

The second compensator circuit 620 may generate the second compensation signal XTC2 by delaying and differentiating the signal THRU1 of the first transmission line 301. Thus, the timing of the second compensation signal XTC2 and the timing of the noise generated in the signal THRU2 may be matched with each other through the delay operation of the second compensator circuit 620.

Since the second receiver circuit 322 receives the signal THRU2 and performs the process of adding up the signal THRU2 of the second transmission line 302 and the second compensation signal XTC2, the far-end crosstalk FEXT1 may be removed from the received signal RCV2.

Comparing FIG. 9 and FIG. 5, the noise caused by the far-end crosstalk FEXT1 in the signal THRU2 may be reliably removed through the delay operation of the second compensator circuit 620.

In accordance with embodiments of the present invention, the integrated circuit may effectively remove crosstalk between adjacent lines.

Although various embodiments have been described and illustrated, it will be apparent to those skilled in the art that various changes and modifications may be made without departing from the spirit and scope of the invention as defined in the following claims.

What is claimed is:

1. An integrated circuit comprising:
   a first transmission line;
   a second transmission line;
   a first compensator circuit suitable for generating a first compensation signal by delaying and differentiating a signal transferred through the second transmission line;
   a second compensator circuit suitable for generating a second compensation signal by delaying and differentiating a signal transferred through the first transmission line;
   a first receiver circuit suitable for receiving the signal transferred through the first transmission line, and compensating for the signal transferred through the first transmission line using the first compensation signal; and
   a second receiver circuit suitable for receiving the signal transferred through the second transmission line, and compensating for the signal transferred through the second transmission line using the second compensation signal,
   wherein the first compensator circuit has a delay value which corresponds to ([delay value of far-end crosstalk from the second transmission line to the first transmission line]–[delay value of the first transmission line]), and
   the second compensator circuit has a delay value which corresponds to ([delay value of far-end crosstalk from the first transmission line to the second transmission line]–[delay value of the second transmission line]).

2. The integrated circuit of claim 1, wherein the first receiver circuit comprises:
   a first receiver suitable for driving a first output line in response to the signal transferred through the first transmission line; and
   a second receiver suitable for driving the first output line in response to the first compensation signal, and
   wherein the second receiver circuit comprises:
   a third receiver suitable for driving a second output line in response to the signal transferred through the second transmission line; and
   a fourth receiver suitable for driving the second output line in response to the second compensation signal.

3. The integrated circuit of claim 1, wherein the first compensator circuit comprises:
   a first delay circuit suitable for delaying the signal transferred through the second transmission line; and
   a first differentiator circuit suitable for generating the first compensation signal by differentiating the signal delayed by the first delay circuit, and
   wherein the second compensator circuit comprises:
   a second delay circuit suitable for delaying the signal transferred through the first transmission line; and
   a second differentiator circuit suitable for generating the second compensation signal by differentiating the signal delayed by the second delay circuit.

4. The integrated circuit of claim 3, wherein the first delay circuit has a delay value which corresponds to ([delay value of far-end crosstalk from the second transmission line to the first transmission line]–[delay value of the first transmission line]–[delay value of the first differentiator circuit]), and the second delay circuit has a delay value which approximately corresponds to ([delay value of far-end crosstalk from the first transmission line to the second transmission line]−[delay value of the second transmission line]−[delay value of the second differentiator circuit]).

5. The integrated circuit of claim 1, wherein the first compensator circuit comprises:
  a first differentiator circuit suitable for differentiating the signal transferred through the second transmission line; and
  a first delay circuit suitable for generating the first compensation signal by delaying the signal differentiated by the first differentiator circuit, and
  wherein the second compensator circuit comprises:
  a second differentiator circuit suitable for differentiating the signal transferred through the first transmission line; and
  a second delay circuit suitable for generating the second compensation signal by delaying the signal differentiated by the second differentiator circuit.

6. The integrated circuit of claim 5, wherein the first delay circuit has a delay value which corresponds to ([delay value of far-end crosstalk from the second transmission line to the first transmission line]−[delay value of the first transmission line]−[delay value of the first differentiator circuit]), and
  wherein the second delay circuit has a delay value which approximately corresponds to ([delay value of far-end crosstalk from the first transmission line to the second transmission line]−[delay value of the second transmission line]−[delay value of the second differentiator circuit]).

7. The integrated circuit of claim 1, wherein the first compensator circuit comprises:
  a first capacitor coupled between an input terminal and an output terminal of the first compensator circuit; and
  a first resistor coupled between a ground terminal and the output terminal of the first compensator circuit, and
  wherein the second compensator circuit comprises:
  a second capacitor coupled between an input terminal and an output terminal of the second compensator circuit; and
  a second resistor coupled between a ground terminal and the output terminal of the second compensator circuit.

8. The integrated circuit of claim 7, wherein a product of a capacitance value of the first capacitor and a resistance value of the first resistor corresponds to forward coupling strength between the first and second transmission lines, and
  a product of a capacitance value of the second capacitor and a resistance value of the second resistor corresponds to the forward coupling strength between the first and second transmission lines.

9. A method for operating an integrated circuit, comprising:
  generating a first compensation signal by delaying and differentiating a signal transferred through a second transmission line;
  generating a second compensation signal by delaying and differentiating a signal transferred through a first transmission line;
  receiving the signal transferred through the first transmission line, and compensating for the signal transferred through the first transmission line using the first compensation signal; and
  receiving the signal transferred through the second transmission line, and compensating for the signal transferred through the second transmission line using the second compensation signal,
  wherein a delay value of the generating of the first compensation signal corresponds to ([delay value of far-end crosstalk from the second transmission line to the first transmission line]−[delay value of the first transmission line]), and
  a delay value of the generating of the second compensation signal corresponds to ([delay value of far-end crosstalk from the first transmission line to the second transmission line]−[delay value of the second transmission line]).

* * * * *